Sept. 29, 1953 J. A. MONAHAN 2,653,405
ICE FISHING JACK
Filed Aug. 17, 1950
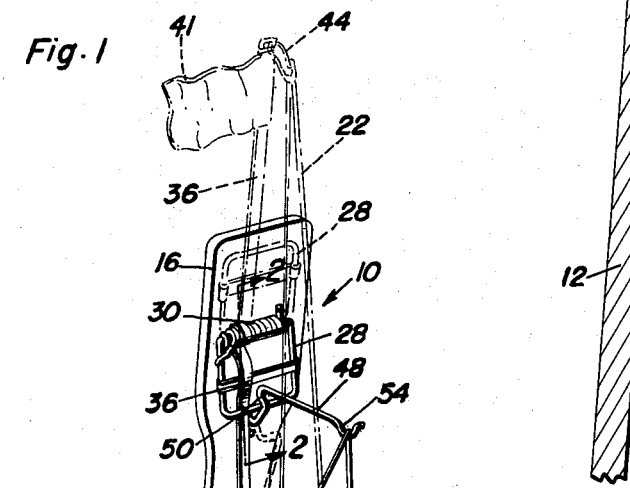
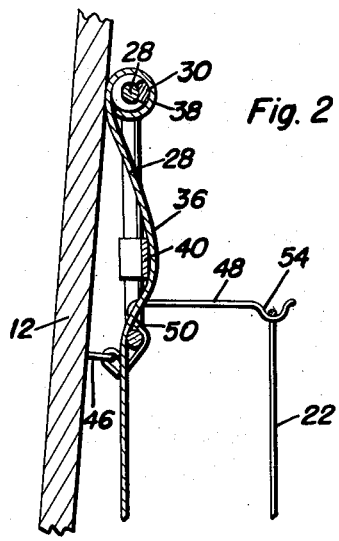
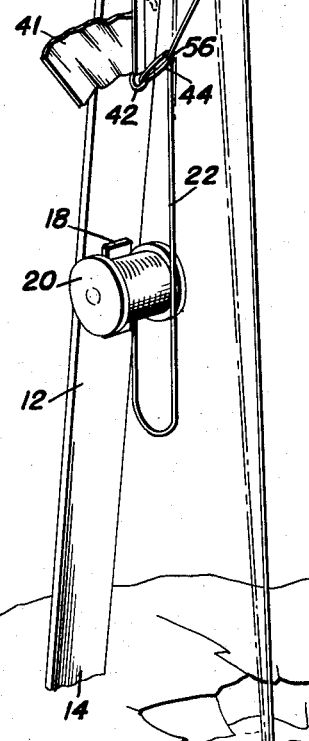
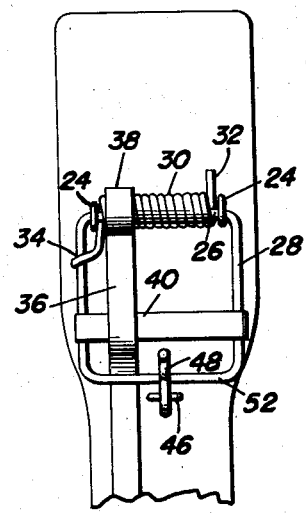
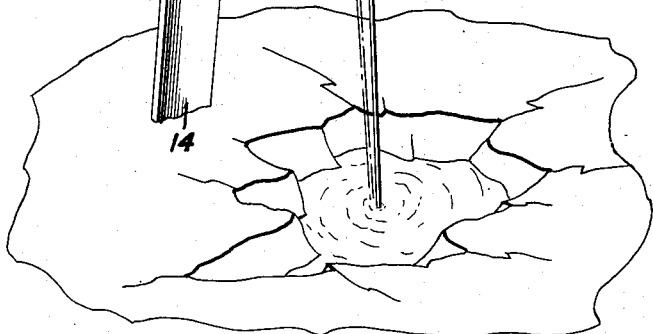
John A. Monahan
INVENTOR.

Patented Sept. 29, 1953

2,653,405

UNITED STATES PATENT OFFICE 2,653,405

ICE FISHING JACK

John A. Monahan, Pittsford, Vt., assignor of fifty per cent to Martin J. Delliveneri, Rutland, Vt.

Application August 17, 1950, Serial No. 180,059

2 Claims. (Cl. 43—16)

This invention relates to a device particularly adapted for fishing through ice and known in the art as a fishing jack.

The primary object of this invention is to provide a device for fishing through ice which automatically signals the fisherman when there is a bite on the line and which, at the same time, enables the fish to play with the line after having been hooked. Because the fish, after being hooked, can play for a substantial length of time, the end of the device acts as a flying rod.

Yet another object of this device is to provide a device of the character described which is relatively simple in design and construction, inexpensive, very efficient for its intended purpose, and very simple to operate.

These, together with various ancillary objects and features of the invention which will later become apparent as the following description proceeds, are attained by the device, a preferred embodiment of which has been illustrated, by way of example only, in the accompanying drawings, wherein:

Figure 1 is a perspective view of the device;

Figure 2 is a sectional view taken substantially on the plane of section line 2—2 of Figure 1; and Figure 3 is an enlarged fragmentary front elevational view of the device.

Specific reference will now be made to the drawings. In the several views, in the accompanying drawings and in the following specification, similar reference characters indicate corresponding elements throughout.

The present device is generally indicated at 10 and includes a support or standard 12 which is elongated and preferably fabricated of wood, having a bottom end 14 adapted to be placed upon the ice and an upper, somewhat enlarged opposite end 16.

Secured medially of the length of the support by an appropriate bracket 18 is a reel 20 having a line 22 wound thereabout, it being understood that the free end of the line which extends through the hole in the ice has an appropriate hook and sinker thereon.

Secured to the enlarged upper ends of the support is a pair of transversely spaced staples 24 rotatably journaling for vertical movement relative to the standard a transverse portion 26 of a substantially rectangularly looped rod 28. Secured about the transverse portion of the rod is a coil spring 30 having one free end 32 pressed against the standard, the other free end 34 being arcuate and engaging one of the longitudinal members of the rectangularly looped rod 28 so that the rod 28 is normally pushed against the standard upwardly in the position shown in dotted lines in Figure 1.

An elongated spring arm 36 is provided which has a coil 38 at its upper end wound about and embracing the coil spring 30, the spring arm being secured by appropriate soldering to a cross bar 40 carried by the rectangularly looped rod 28. Adjacent the free end of the spring arm and secured thereto is a signal flag 41 and at the free end of the spring arm is an eye hook 42 carrying an appropriate loop or clip 44.

Secured to the standard adjacent its upper enlarged end is a staple 46 upon which is pivoted for vertical movement a latch rod 48. The latch bar includes an arcuate offset portion 50 which is adapted to engage the lower transverse member 52 of the rectangular rod 28, as shown clearly in Figures 1 and 2. The free end of the latch rod 48 includes a hook portion 54.

In practical operation, the standard or support 12 is positioned upon the ice at its lower end 14 as shown clearly in Figure 1. The rectangularly looped rod 28 is pushed downwardly to assume the position shown in solid line in the figure and is releasably retained in this downward position by having the arcuate offset portion 50 of the latch rod 48 engage the lower transverse member 52 of the rectangular rod 28. The line 22 is knotted as at 56 to the loop 44 and is then made to extend over the latch rod 48 in the hook end 54. After the proper depth of the fishing line 22 has been ascertained, the fishing operation commences. It will be seen that in this position, the flag 41 is retained in a downward position until a fish hooks the line, pulling downwardly on the latch rod 48 to release the rectangular rod 28 which is snapped into an upward position, as shown in dotted lines in Figure 1, exposing the flag over the top of the standard and thus indicating the catch. Since the member carrying the signal flag is a spring arm, the fish will be able to play with the bait on the hook (not shown) for some time before the fish is retrieved. In this manner, the device acts simultaneously as a signal and fly rod.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A fishing device comprising an elongated support, a reel secured to said support intermediate its ends and having a line wound thereon, a rectangular frame including a pair of transverse and a pair of longitudinal portions adjacent one end of said support, one transverse portion of said frame being pivotally secured to said support whereby the frame may be swung on said support, a coil spring surrounding said one transverse portion of said frame and having one of its ends contacting said support and the other of its ends contacting a longitudinal portion of said frame and normally biasing said frame in one direction with respect to the support, a transverse cross piece secured to said frame intermediate its transverse portions, a spring arm connected at one of its ends to said one transverse portion and extending over said cross piece and under the other of said transverse portions whereby the arm will swing with the frame, said arm terminating at a point remote from said frame and having a portion of said line connected thereto, a latch rod pivotally secured to said support adjacent said other transverse portion, said latch rod having an arcuate recess retaining said other transverse portion adjacent said support against the action of the coil spring, and a hook on the free end of said latch rod, said line extending from said arm over said hook whereby movement of said hook releases said rod and causes said arm to be pivoted along with said one transverse portion upon swinging movement of said rod.

2. A fishing device comprising an elongated support, a reel mounted intermediate the ends of said support and having a line wound thereon, a spring urged member swingably mounted at one end of said support and being normally urged away from said reel, a latch rod pivotally secured to said support adjacent said spring urged member and maintaining said member in a position toward said reel, said spring urged member pressing said latch rod in a direction perpendicular to said support, and a spring bar carried by said spring urged member and swingable therewith and extending toward said reel, said spring bar having a signal device on the free end thereof, a portion of said line being secured to the free end of said bar and extending over said latch rod whereby movement of the line will trip the spring urged member and swing the spring bar.

JOHN A. MONAHAN.

References Cited in the file of this patent

UNITED STATES PATENTS

| Number | Name | Date |
|---|---|---|
| 479,219 | Lane | July 19, 1892 |
| 783,169 | Ball | Feb. 21, 1905 |
| 1,819,034 | Luelloff | Aug. 18, 1931 |
| 2,137,771 | Goodwin | Nov. 22, 1938 |

FOREIGN PATENTS

| Number | Country | Date |
|---|---|---|
| 86,160 | Austria | Apr. 15, 1921 |
| 906,202 | France | Dec. 27, 1945 |